US008009634B2

(12) United States Patent
Lee et al.

(10) Patent No.: US 8,009,634 B2
(45) Date of Patent: Aug. 30, 2011

(54) APPARATUS AND METHOD FOR REDUCING OTHER-CELL INTERFERENCE IN A BROADBAND WIRELESS COMMUNICATION SYSTEM

(75) Inventors: Yong-Hwan Lee, Seoul (KR);
Keon-Wook Lee, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 1008 days.

(21) Appl. No.: 11/766,876

(22) Filed: Jun. 22, 2007

(65) Prior Publication Data

US 2008/0130582 A1      Jun. 5, 2008

(30) Foreign Application Priority Data

Jun. 23, 2006    (KR) .................... 10-2006-0056792

(51) Int. Cl.
*H04W 4/00* (2009.01)
(52) U.S. Cl. ............... 370/332; 455/63.1; 455/114.2; 455/278.1; 455/296; 370/334
(58) Field of Classification Search ........ 370/63.1, 370/114.2, 278.1, 296; 455/332, 334
See application file for complete search history.

(56) References Cited

U.S. PATENT DOCUMENTS

| 5,881,055 | A  | * | 3/1999 | Kondo | 370/311 |
| 6,341,222 | B1 | * | 1/2002 | Neumiller et al. | 455/422.1 |
| 6,865,173 | B1 | * | 3/2005 | Czaja et al. | 370/342 |
| 2001/0027114 | A1 | * | 10/2001 | Kim | 455/522 |
| 2001/0053695 | A1 |   | 12/2001 | Wallentin | |
| 2003/0003906 | A1 |   | 1/2003 | Demers et al. | |
| 2004/0077378 | A1 | * | 4/2004 | Kim et al. | 455/562.1 |
| 2004/0147243 | A1 | * | 7/2004 | McKenna | 455/403 |
| 2004/0202140 | A1 | * | 10/2004 | Kim et al. | 370/335 |
| 2004/0243376 | A1 | * | 12/2004 | Karunaratne | 703/18 |
| 2005/0070283 | A1 | * | 3/2005 | Hashimoto et al. | 455/435.1 |
| 2005/0192015 | A1 | * | 9/2005 | Abusch-Magder et al. | 455/446 |
| 2006/0094363 | A1 | * | 5/2006 | Kang et al. | 455/63.1 |
| 2006/0135169 | A1 | * | 6/2006 | Sampath et al. | 455/447 |
| 2006/0252428 | A1 | * | 11/2006 | Agashe et al. | 455/436 |
| 2007/0010253 | A1 | * | 1/2007 | Gunnarsson et al. | 455/442 |
| 2007/0049324 | A1 | * | 3/2007 | Sambhwani et al. | 455/525 |
| 2007/0135153 | A1 | * | 6/2007 | Cai et al. | 455/522 |
| 2007/0191013 | A1 | * | 8/2007 | Gunnarsson et al. | 455/438 |
| 2007/0191054 | A1 | * | 8/2007 | Das et al. | 455/525 |
| 2007/0254620 | A1 | * | 11/2007 | Lindqvist et al. | 455/403 |
| 2007/0263585 | A1 | * | 11/2007 | Duan | 370/342 |
| 2007/0280170 | A1 |   | 12/2007 | Kawasaki | |
| 2009/0181673 | A1 | * | 7/2009 | Barrett | 455/436 |

FOREIGN PATENT DOCUMENTS

KR    10-2003-0017205 A    3/2003
KR       2003-0017205 A    3/2003

\* cited by examiner

*Primary Examiner* — Kamran Afshar
*Assistant Examiner* — Edward Zhang
(74) *Attorney, Agent, or Firm* — Jefferson IP Law, LLP

(57) ABSTRACT

An apparatus and method for avoiding interference in a broadband wireless communication system using FCS are provided. The apparatus and method include a receiver for monitoring channel statuses of neighbor cells using signals received from the neighbor cells, an active set generator for generating an active set according to at least one of the channel statuses of the neighbor cells, loads of the neighbor cells, and a performance gain from the neighbor cells, and a BS selector for selecting a serving cell from the active set according to the channel statuses of cells included in the active set. Accordingly, interference is reduced and reception performance is improved.

27 Claims, 16 Drawing Sheets

APPARATUS AND METHOD FOR REDUCING OTHER-CELL INTERFERENCE IN A BROADBAND WIRELESS COMMUNICATION SYSTEM

PRIORITY

This application claims the benefit under 35 U.S.C. §119(a) of a Korean patent application filed on Jun. 23, 2006 in the Korean Intellectual Property Office and assigned Serial No. 2006-56792, the entire disclosure of which is hereby incorporated by reference.

JOINT RESEARCH AGREEMENT

The claimed invention was made by, on behalf of, and/or in connection with one or more of the following parties to a joint university-corporation research agreement: Samsung Electronics Co. Ltd. and Seoul National University Industry Foundation. The agreement was in effect on and before the date the claimed invention was made, and the claimed invention was made as a result of activities undertaken within the scope of the agreement.

BACKGROUND OF THE INVENTION

1. Field of the Invention

The present invention relates generally to a broadband wireless communication system. More particularly, the present invention relates to an apparatus and method for improving the reception performance of a Mobile Station (MS) by reducing Other-Cell Interference (OCI) in a broadband wireless communication system.

2. Description of the Related Art

In a broadband wireless communication system, when an MS is located at a cell boundary, far from its serving Base Station (BS), it suffers from a decreased reception performance due to path loss. When the distance to a neighbor BS is approximately the same as the distance to the serving BS, the MS may receive signals with similar power levels from the serving BS and the neighbor BS. Therefore, the signal from the neighbor BS interferes with the signal from the serving BS.

In a broadband wireless communication system a handover process is used to connect an MS from a serving BS to a neighbor BS that offers a better link. The handover process ensures that the MS continues to receive an on-going service without interruption.

The handover ensures the mobility of the MS and enables the MS to select a better link. The broadband wireless communication system makes a decision as to whether handover is required for the MS by assessing the link statuses between the MS and BSs based on the Signal-to-Interference and Noise Ratios (SINRs) of signals received from the BSs at the MS. That is, the decision is made using the average SINRs of channels associated with path loss and shadowing (i.e. the long-term statistics of the channels).

Another approach to improving the reception performance is Fast Cell site Selection (FCS). In the FCS scheme, the MS at the cell boundary selects a cell (or sector) offering a better link according to instantaneous SINRs reflecting fast fading of channels.

As mentioned earlier, if an MS is located at a cell boundary, it is at similar distances from a serving BS and a neighbor BS. The MS receives signals with similar average reception power levels from the serving BS and the neighbor BS, and experiences independent fast fading from the BSs. The MS can achieve a site selection diversity gain by receiving data selectively from a BS that offers the better link status at a given time instant by the FCS scheme.

FIG. 1 illustrates a configuration of a conventional broadband wireless communication system for performing FCS.

Referring to FIG. 1, a broadband wireless communication system includes a router 100, a first BS 110 (BS1), a second BS 120 (BS2) and an MS 130. The router 100 provides data to both the first and second BSs 110 and 120. The MS 130, located at a cell boundary, determines an active set including first and second BSs 110 and 120 (BS1 and BS2), for example, based on the link statuses of their cells (e.g. average SINRs) in order to perform FCS.

The MS 130 then measures the instantaneous SINRs of signals received from the active cells of the active set and selects the cell that offers the best link to camp on. For instance, the MS 130 measures the instantaneous SINRs of BS1 and BS2 and selects one of the BSs from which the MS 130 will receive a downlink signal according to the instantaneous SINRs. Then the MS 130 receives data from the selected BS.

As described above, the MS selects the link having the best channel status by measuring the instantaneous SINRs of neighbor cells in the broadband wireless communication system. As the MS receives data from the selected cell, it can achieve a site selection diversity gain.

If the MS is located at a cell boundary, the instantaneous SINRs rapidly drop because of OCI from neighbor cells, as illustrated in FIG. 2.

FIG. 2 is a graph illustrating variations of instantaneous SINRs according to locations of an MS in a cell area in the conventional broadband wireless communication system. In the illustrated case of FIG. 2, the instantaneous SINRs are compared between the case where the MS is at the center of a cell (e.g. d=300 m) and the case where the MS is at a cell boundary (e.g. d=2300 m). The instantaneous SINRs are normalized to average SINRs, for comparison.

As the graph reveals, when the MS is at the center of the cell, it is affected less by OCI due to path loss. Therefore, the MS does not suffer from as great a change in instantaneous SINR.

On the other hand, when the MS is at the cell boundary, its distance from a serving cell and neighbor cells is similar and thus it receives signals with similar power levels from the serving and neighbor cells. As a result, the MS suffers from fluctuating changes in instantaneous SINR due to OCI.

The fluctuation of instantaneous SINR places the MS in different channel statuses when the MS monitors its channel status and when it transmits actual data. This means that the MS may not select a cell offering a better link because of the instantaneous SINR changes caused by OCI.

SUMMARY OF THE INVENTION

An aspect of the present invention is to address at least the above-mentioned problems and/or disadvantages and to provide at least the advantages described below. Accordingly, an object of the present invention is to provide an apparatus and method for improving the reception performance of an MS by reducing OCI in a broadband wireless communication system.

Another object of the present invention is to provide an apparatus and method for improving the reception performance of an MS by reducing OCI in a broadband wireless communication system using FCS.

A further object of the present invention is to provide an apparatus and method for reducing interference from active cells included in an active set except for a serving cell in a broadband wireless communication system using FCS.

Still another object of the present invention is to provide an apparatus and method for reducing interference by preventing active cells included in an active set except for a serving cell from using a frequency band allocated to an MS by the serving cell in a broadband wireless communication system using FCS.

According to an aspect of the present invention, an apparatus of an MS in a wireless communication system using FCS is provided. The apparatus includes a receiver for monitoring channel statuses of neighbor cells using signals received from the neighbor cells, an active set generator for generating an active set according to at least one of the channel statuses of the neighbor cells, loads of the neighbor cells, and a performance gain from the neighbor cells, and a BS selector for selecting a serving cell from the active set according to the channel statuses of cells included in the active set.

According to another aspect of the present invention, an apparatus of a BS in a wireless communication system using FCS is provided. The apparatus includes a receiver for receiving a signal from an MS or neighbor cells, an active set manager for determining whether to approve an active set approval request according to a load of the BS, upon receipt of the active set approval request signal from the MS, and a scheduler for scheduling the MS according to channel status of the MS, upon receipt of a data request signal.

According to a further aspect of the present invention, a method for configuring an active set in a wireless communication system using FCS is provided. The method includes selecting a cell with the highest average power level from among neighbor cells, calculating a performance gain that can be achieved by adding the selected cell to the active set, and adding the selected cell to the active set, if the performance gain is increased.

According to still another aspect of the present invention, an operation method of an MS for avoiding interference in a wireless communication system using FCS is provided. The method includes generating an active set according to at least one of channel statuses of neighbor cells, loads of the neighbor cells, and a performance gain from the neighbor cells, monitoring channel statuses of cells included in the active set, transmitting CQIs of the cells to a scheduler, and receiving data according to frequency band information included in a control channel, upon receipt of scheduling information for the data on the control channel from a cell included in the active set.

According to a still further aspect of the present invention, an operation method of a scheduler for avoiding interference in a wireless communication system using FCS is provided. The method includes evaluating CQIs of neighbor cells of an MS received from the MS, scheduling the MS according to the CQIs, and when a serving cell and a frequency band are selected for the MS through the scheduling, scheduling is performed not to allocate the selected frequency band to the other cells included in an active set except the selected serving cell.

According to yet another aspect of the present invention, an operation method of an MS for avoiding interference in a wireless communication system using FCS is provided. The method includes generating an active set according to at least one of average power levels, loads, and a performance gain of neighbor cells, detecting information about a frequency band for communicating with a serving cell from a cell included in the active set, selecting a cell in the best channel status of the frequency band from among the cells included in the active set, and transmitting a data request signal to the selected cell in the frequency band.

According to yet a further aspect of the present invention, an operation method of a BS for avoiding interference in a wireless communication system using FCS is provided. The method includes transmitting information about a frequency band to be allocated to an MS to the MS, the frequency band being determined by negotiations with neighbor cells included in an active set, and transmitting data to the MS in the frequency band, upon receipt of a data request signal from the MS.

According to yet another aspect of the present invention, an operation method of a BS for avoiding interference in a wireless communication system using FCS is provided. The method includes detecting, upon receipt of a data request signal from an MS, CQI and information about a requested frequency band from the data request signal, scheduling the MS using the CQI, and a signal requesting the other cells included in an active set except the BS not to use the frequency band, if the requested frequency band is allocated to the MS by the scheduling.

BRIEF DESCRIPTION OF THE DRAWINGS

The above and other objects, features and advantages of exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for reducing the effects of OCI on an MS located at a cell boundary in a broadband wireless communication system using FCS.

While exemplary embodiments of the present invention are described in the context of an Orthogonal Frequency Division Multiple Access (OFDMA) wireless communication system, it is to be understood that the present invention is also applicable to communication systems using other multiple access schemes. In the following description, a serving cell is a cell having a link with the best channel status from among active cells in an active set. The channel status is evaluated by instantaneous SINR and the active set is defined as a group of cells from which the MS can receive data.

Figure 1:
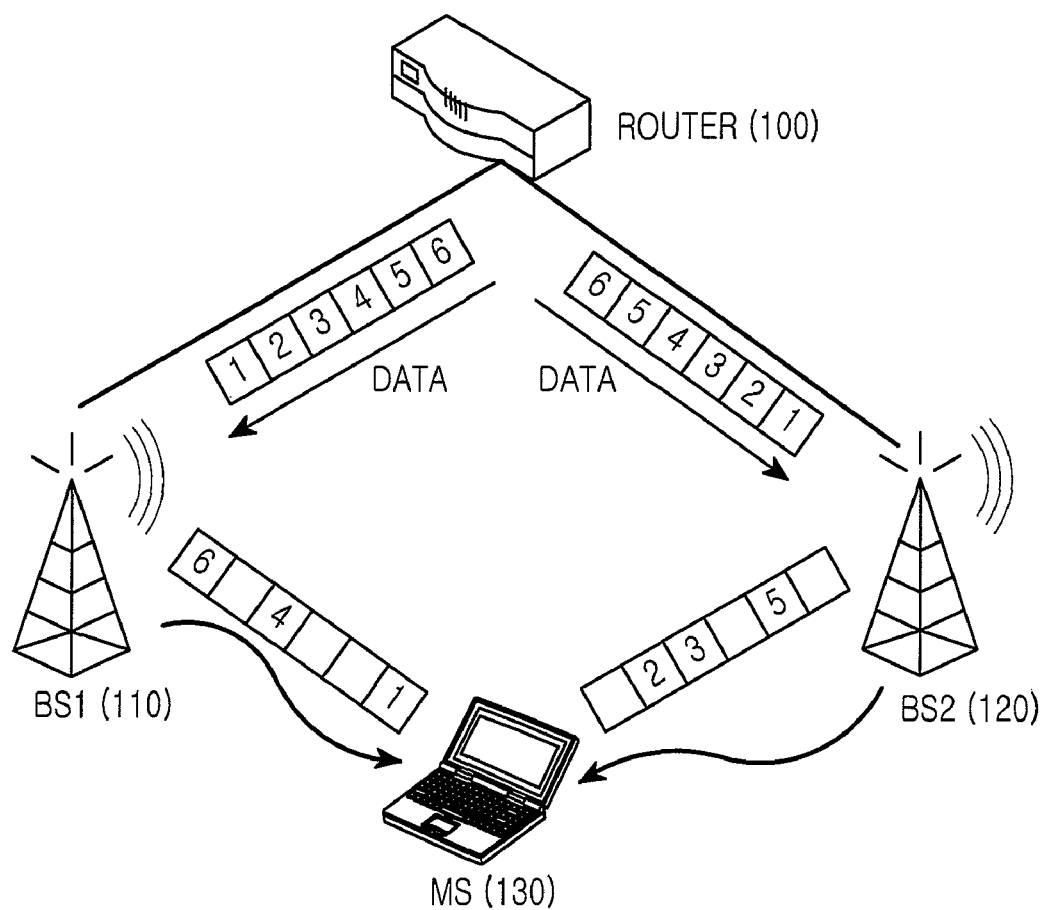
FIG. 1 illustrates a configuration of a conventional broadband wireless communication system for performing FCS.
Figure 2:
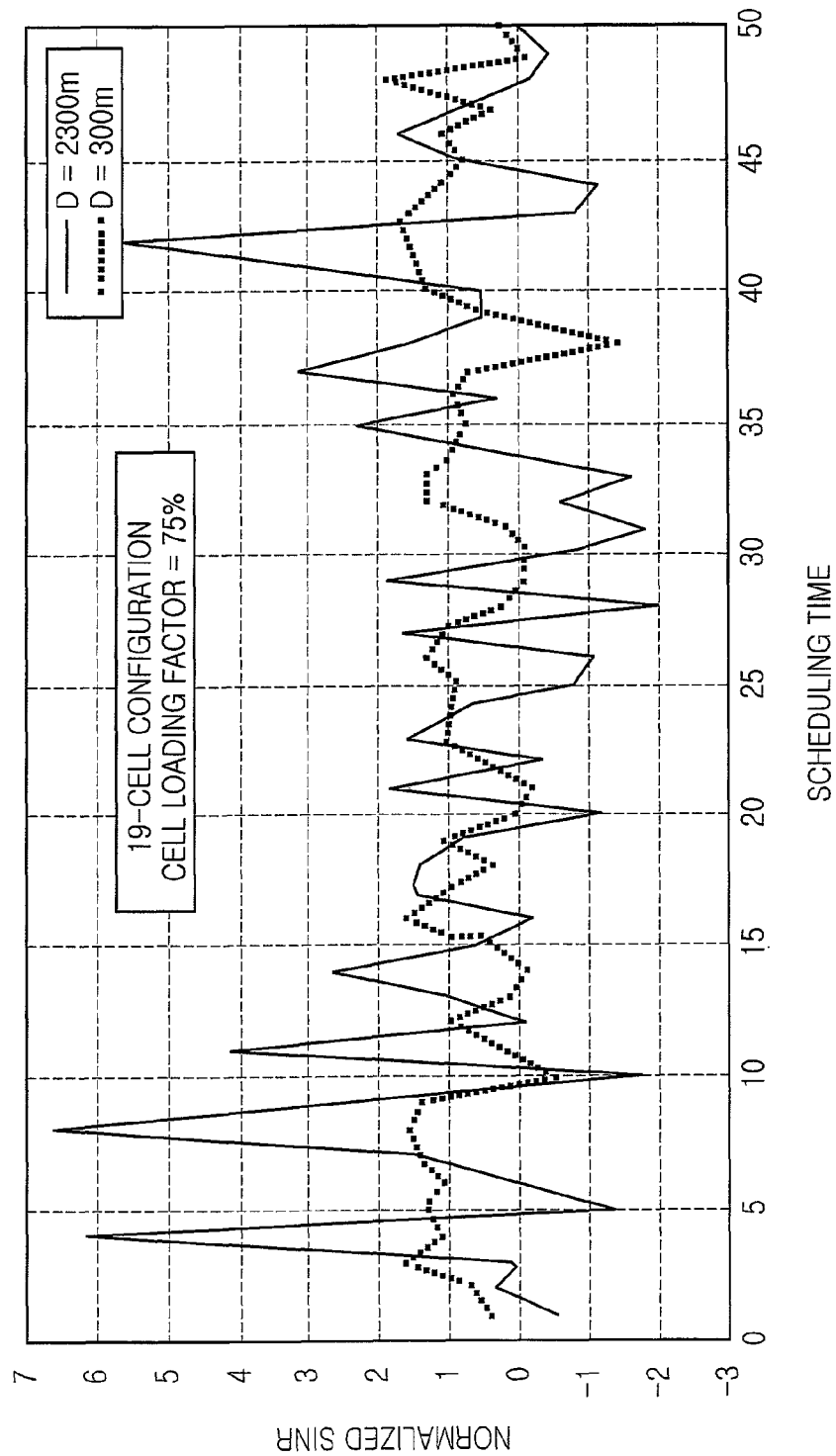
FIG. 2 is a graph illustrating variations of instantaneous SINRs according to locations of an MS in a cell area in the conventional broadband wireless communication system of FIG. 1.
Figure 3:
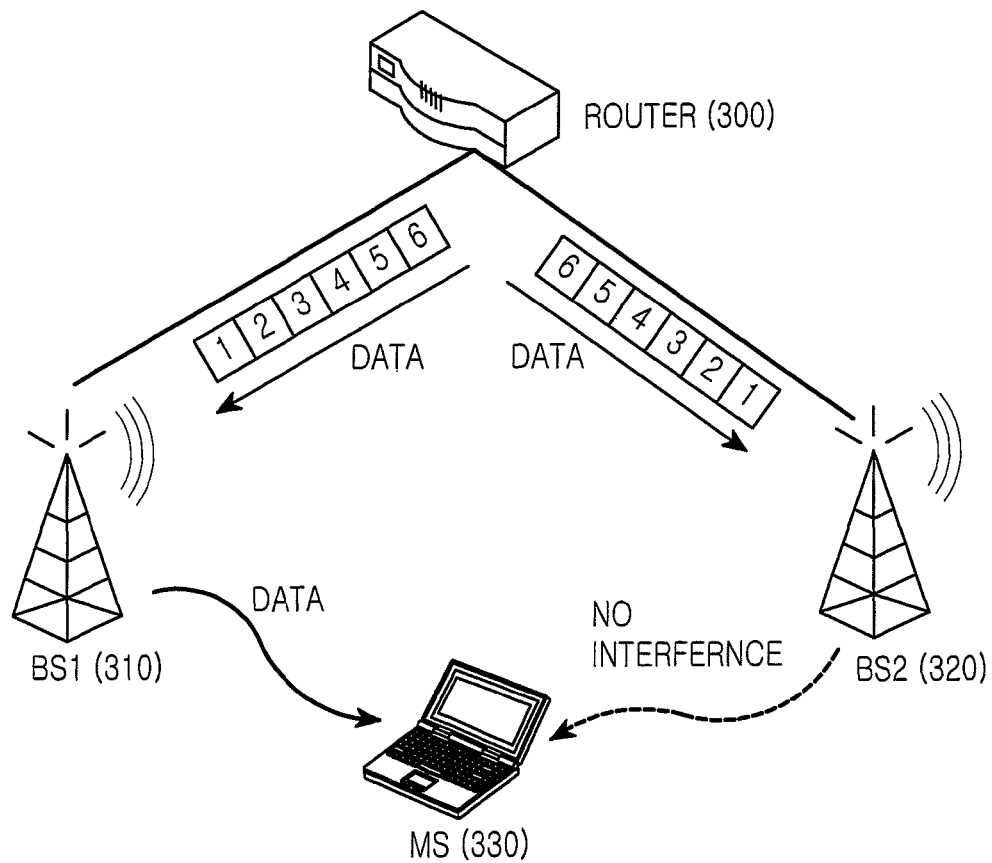
FIG. 3 illustrates a configuration of a broadband wireless communication system for reducing interference for an MS located at a cell boundary according to an exemplary embodiment of the present invention.

FIG. 3 illustrates a configuration of a broadband wireless communication system for reducing interference for an MS located at a cell boundary according to an exemplary embodiment of the present invention.

Referring to FIG. 3, an exemplary broadband wireless communication system includes a router 300, a first BS 310 (BS1), a second BS 320 (BS2) and an MS 330. The MS 330, located at a cell boundary, forms an active set (e.g. first and second BSs 310 and 320 (BS1 and BS2)) according to the link statuses (e.g. average SINRs) of neighbor cells in order to perform FCS.

The MS 330 then measures the instantaneous SINRs of signals received from all active cells included in the active set and selects the cell offering the best link as its serving cell. The other active cells of the active set except the serving cell do not use a frequency band that the serving cell allocates to the MS 330. For example, if the MS 330 receives data from BS1, BS2 leaves a frequency band allocated to the MS 330 by BS1 unused. Hence, the MS 330 can reduce OCI.

As described above, the MS forms an active set in a link-adaptive fashion according to the channel statuses of neighbor cells, selects a serving cell to camp on according to the instantaneous SINRs of active cells of the active set, and then receives signals from the serving cell. The active set may be formed using a procedure illustrated in FIG. 4.

Figure 4:
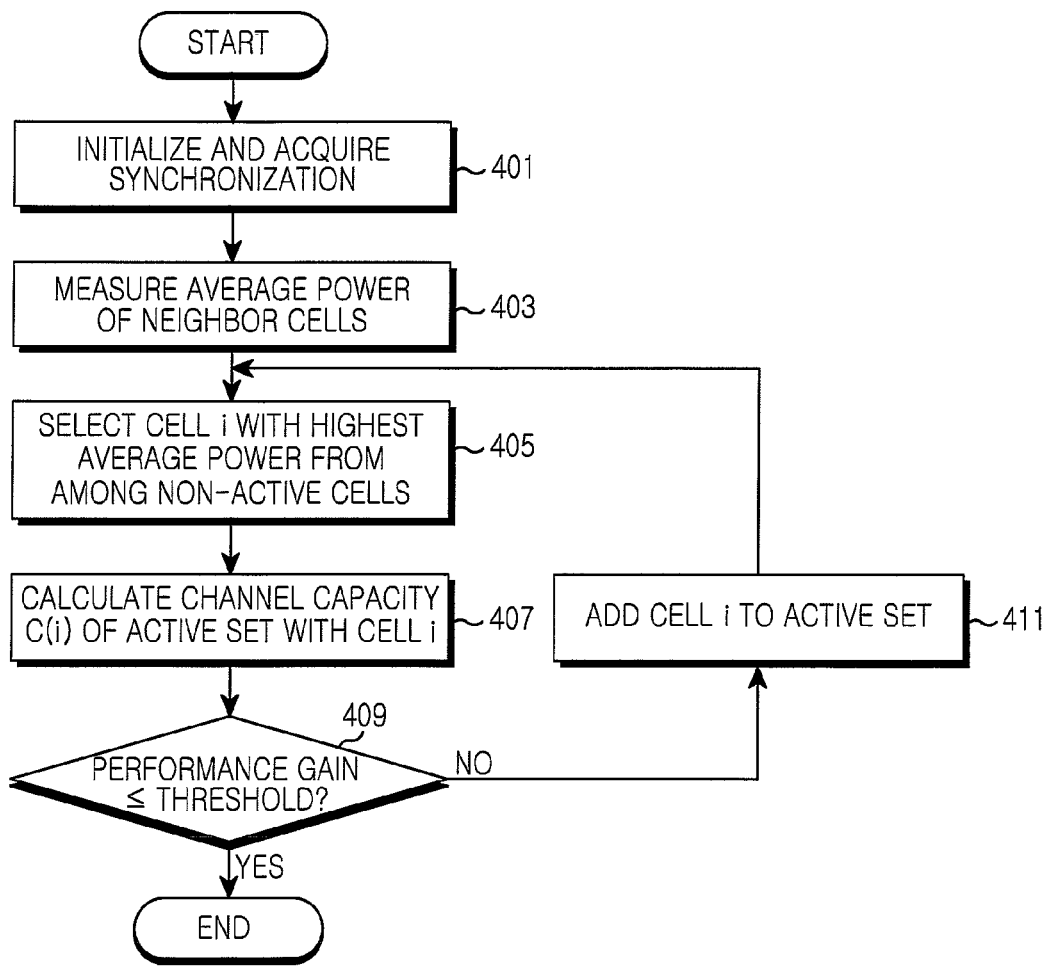
FIG. 4 is a flowchart illustrating an operation of an MS for generating an active set in a broadband wireless communication system according to an exemplary embodiment of the present invention.

FIG. 4 is a flowchart illustrating an operation of the MS for generating an active set in the broadband wireless communication system according to an exemplary embodiment of the present invention.

Referring to FIG. 4, the MS initializes an active set Ω and the channel capacity C(Ω) of the active set Ω and acquires synchronization to neighbor cells in step 401. For example, the MS initializes the active set Ω to an empty set and the channel capacity C(Ω) to 0. The MS identifies a signal from each neighbor cell by the Identification (ID) of the neighbor cell.

In step 403, the MS measures the average power levels of signals received from the neighbor cells. The MS then selects a cell i with the highest average power level from among non-active cells that do not belong to an active set in step 405.

In step 407, the MS calculates the channel capacity of the active set that would include the selected cell i. For instance, the MS calculates a channel capacity upper bound of the active set that would include the selected cell i by $$C(\Omega) \leq \log_2(1 + E\{\Gamma_{n,k}\}) \quad (1)$$

where C(Ω) denotes the channel capacity of the active set Ω, n denotes the number of cells included in the active set Ω, and k denotes the index of the MS. $E\{\Gamma_{n,k}\}$ is given by $$E\{\Gamma_{n,k}\} = \sum_{i=1}^{n} \left[ (-1)^{i+1} \cdot \sum_{j=0}^{nC_i} \frac{H_{n,k}^{(i)}(j)}{i} \right] \quad (2)$$

where $\Gamma_{n,k}$ denotes a maximum instantaneous SINR that the $k^{th}$ MS can achieve and $H_{n,k}^{(i)}(j)$ denotes a $j^{th}$ element in a set $H_{n,k}^{(i)}$ with entries being the Harmonic means of all combinations each having i elements selected from a set of the average power levels of the n cells $\{\bar{\gamma}_{1,k,n}, \bar{\gamma}_{2,k,n}, \bar{\gamma}_{n,k,n}\}$.

After calculating the channel capacity of the active set including the $i^{th}$ cell in step 407, the MS calculates a performance gain of the active set Ω including the $i^{th}$ cell using Equation (3) and compares the performance gain with a threshold in order to determine whether to include the $i^{th}$ cell in the active set in step 409. Equation (3) is given by $$\xi = \frac{C(\Omega \cup i) - C(\Omega)}{C(\Omega)} \quad (3)$$

where ξ denotes the performance gain, C(Ω) denotes the channel capacity of the current active set Ω without the $i^{th}$ cell, and C(Ω ∪ i) denotes the channel capacity of the active set with the $i^{th}$ cell. The threshold may be determined by taking into account a gain and cost that can be achieved for the active set Ω including the $i^{th}$ cell.

If the performance gain is larger than the threshold (ξ>threshold), the MS adds the $i^{th}$ cell to the active set Ω in step 411 and returns to step 405 to determine whether there is another cell to be included in the active set Ω.

If the performance gain is less than or equal to the threshold ($\xi \leq$threshold), the MS ends the algorithm without adding the $i^{th}$ cell to the active set $\Omega$.

Although not shown, the MS notifies the BSs that cover the active cells of the active set that the cells are included in the active set, after forming the active set in the procedure of FIG. 4. The BSs check their loads and determine whether to approve designation of their cells as active cells in the active set. If their loads are large, the BSs reject designation of their cells as active cells.

If a BS rejects designation of its cell as an active cell, the MS forms a final active set from which the cell is removed.

The active set can be formed every time as needed or periodically.

After the active set formation, the broadband wireless communication system prevents the other cells of the active set except a serving cell from using a frequency band that the serving cell allocates to the MS. For this purpose, two approaches can be taken. Hereinbelow, Channel Quality Information (CQI) is instantaneous SINR.

One of the two approaches is to schedule a plurality of BSs by an upper centralized scheduler. The centralized scheduler can control FCS, taking into account of the channel statuses between the MS and cells and the loads of the cells.

Figure 5:
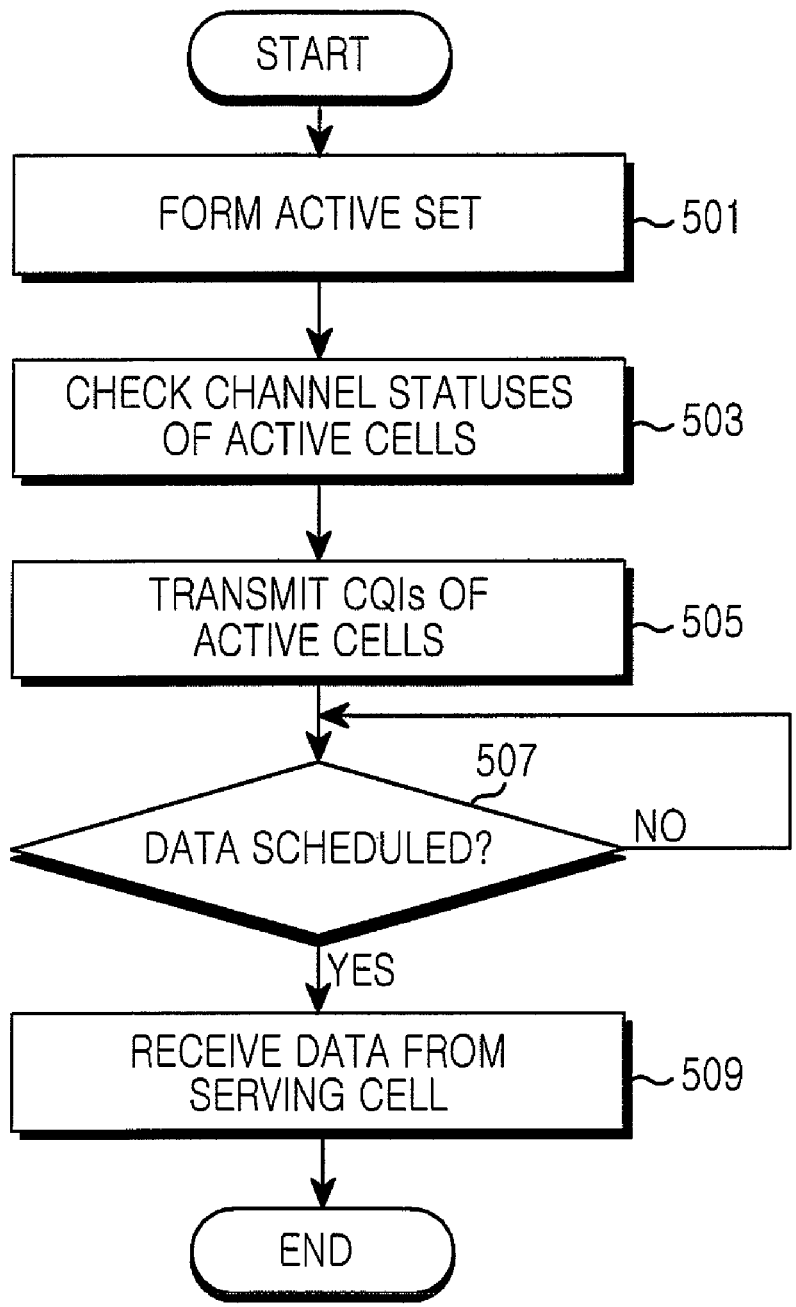
FIG. 5 is a flowchart illustrating an operation of an MS for reducing OCI in a broadband wireless communication system according to an exemplary embodiment of the present invention.

FIG. 5 is a flowchart illustrating an operation of an MS for reducing OCI in a broadband wireless communication system according to an exemplary embodiment of the present invention.

Referring to FIG. 5, the MS forms an active set in step 501. For example, the MS forms an active set according to at least one of the average power levels of neighbor cells, performance gain, and the loads of BSs covering the cells in the procedure of FIG. 4.

In step 503, the MS monitors the channel statuses of the active cells of the active set by measuring signals received from the active cells every time instant.

The MS then reports the CQIs of the active cells to the centralized scheduler in step 505 and monitors control channels received from BSs covering the active cells to determine whether data directed to the MS has been scheduled in step 507. The control channels are any type of signals from the BSs that deliver scheduling results of the BSs.

If data directed to the MS has been scheduled in one of the active cells, the MS receives data from the serving cell according to frequency band information included in a control channel signal received from the serving cell in step 509. Then the MS ends the algorithm.

Figure 6:
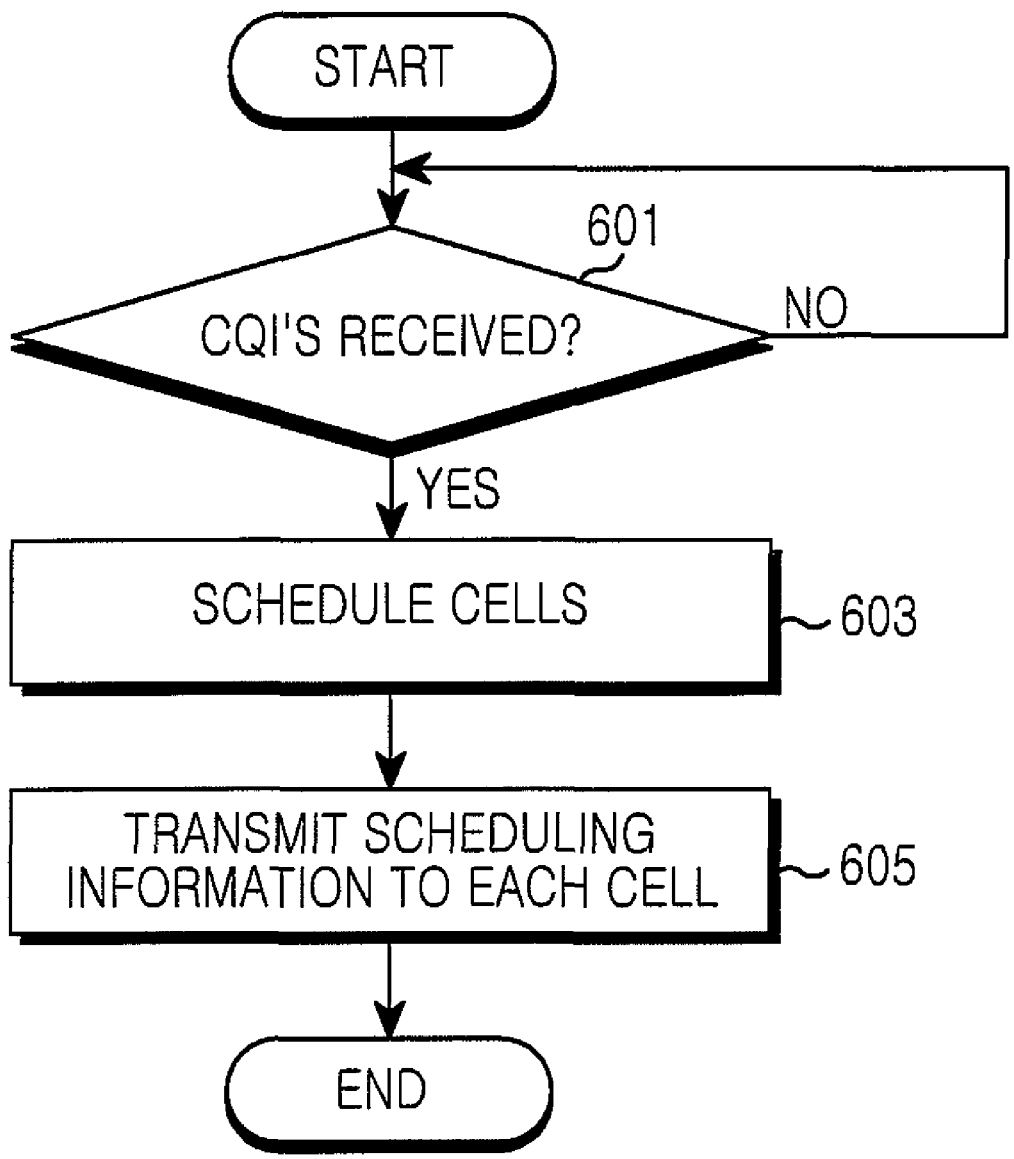
FIG. 6 is a flowchart illustrating an operation of a centralized scheduler for reducing OCI in a broadband wireless communication system according to an exemplary embodiment of the present invention.

FIG. 6 is a flowchart illustrating an operation of a centralized scheduler for reducing OCI in a broadband wireless communication system according to an exemplary embodiment of the present invention.

Referring to FIG. 6, the scheduler monitors reception of the CQIs of neighbor cells from the MS in step 601. The neighbor cells are the active cells of an active set formed by the MS.

Upon receipt of the CQIs of the active cells, the scheduler schedules the cells based on the CQIs and determines a serving cell and a frequency band for servicing the MS in step 603. At the same time, the scheduler does not allocate the determined frequency band to the other active cells except the serving cell.

In step 605, the scheduler transmits scheduling information to a serving BS covering the serving cell.

Then the scheduler ends the algorithm.

Figure 7:
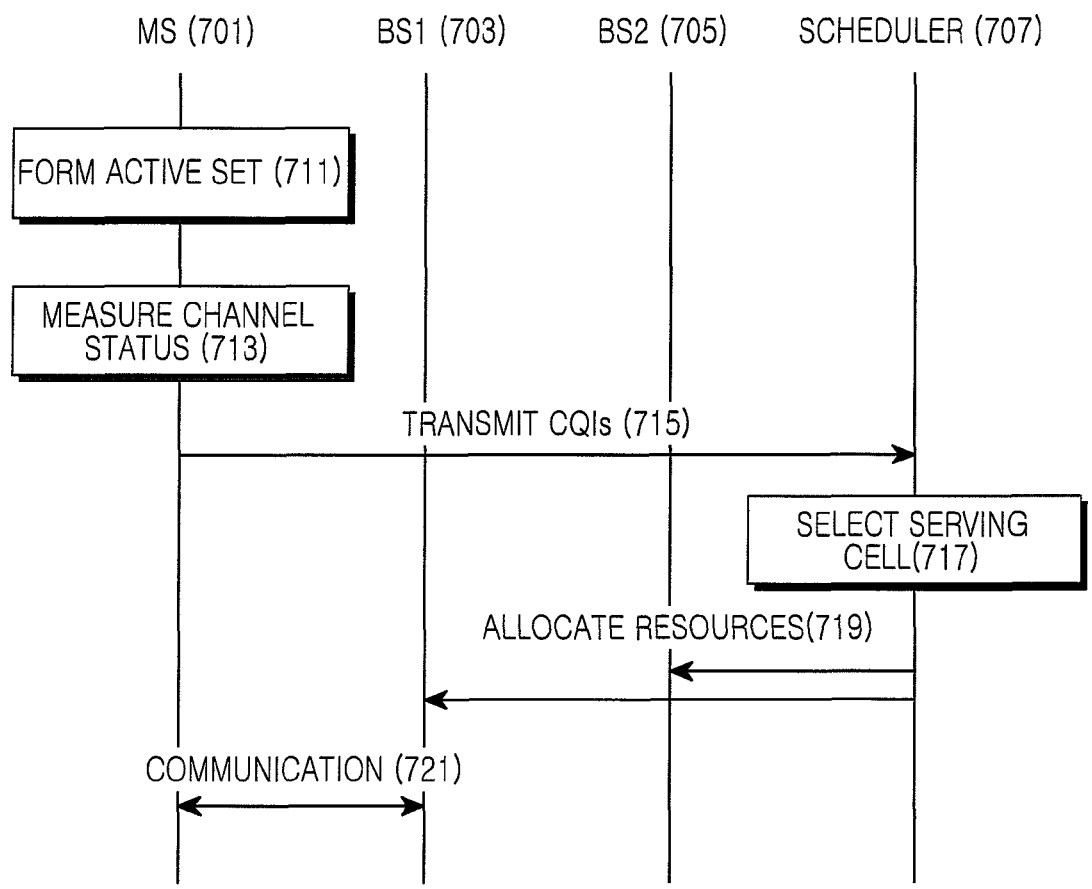
FIG. 7 is a diagram illustrating a signal flow for reducing OCI in a broadband wireless communication system according to an exemplary embodiment of the present invention.

FIG. 7 is a diagram illustrating a signal flow for reducing OCI in a broadband wireless communication system according to an exemplary embodiment of the present invention. In the illustrated case of FIG. 7, it is assumed that an active set includes first and second BSs 703 and 705 (BS1 and BS2) as active cells.

Referring to FIG. 7, an MS 701 forms an active set using signals received from neighbor cells in step 711. While not shown, the MS 701 determines a final active set by performing an approval procedure with BSs covering active cells (e.g. BS1 and BS2).

The MS 701 measures the channel statuses of BS1 and BS2 in the active set using signals received from BS1 and BS2 in step 713 and transmits the CQIs of BS1 and BS2 to a scheduler 707 in step 715.

The scheduler 707 schedules the cells based on the CQIs and determines a serving cell (e.g. BS1) and a frequency band to provide a service to the MS 701 in step 717. At the same time, the scheduler 707 does not allocate the determined frequency band to the other BS, i.e. BS2 in the active set so that that BS1 can service the MS 701.

In step 719, the scheduler 707 transmits scheduling information to BS1 and BS2.

In step 721, BS1 and BS2 transmit data according to the scheduling information. During the data transmission, BS2 does not use the frequency band which BS1 uses to provide service to the MS 701 according to the scheduling information.

The MS 701 monitors control channels from BS1 and BS2 covering the active cells of the active set. If one (e.g. BS1) of the BSs schedules data for the MS 701, the MS 701 receives data from BS1 in step 721.

Another approach to FCS is that the MS selects a serving cell based on the channel statuses of active cells, in the case where cells perform scheduling independently. For OCI reduction, this approach can be considered in three ways: one is that a frequency band to be allocated to the MS is determined by negotiations among the active cells, another way is that the MS selects a serving cell and a frequency band and OCI is reduced by exchanging information among the active cells, and the other way is that the MS selects a serving cell and a frequency band, and transmits a CQI signal to the serving cell and a signal requesting no scheduling in the frequency band to the other active cells.

Figure 8:
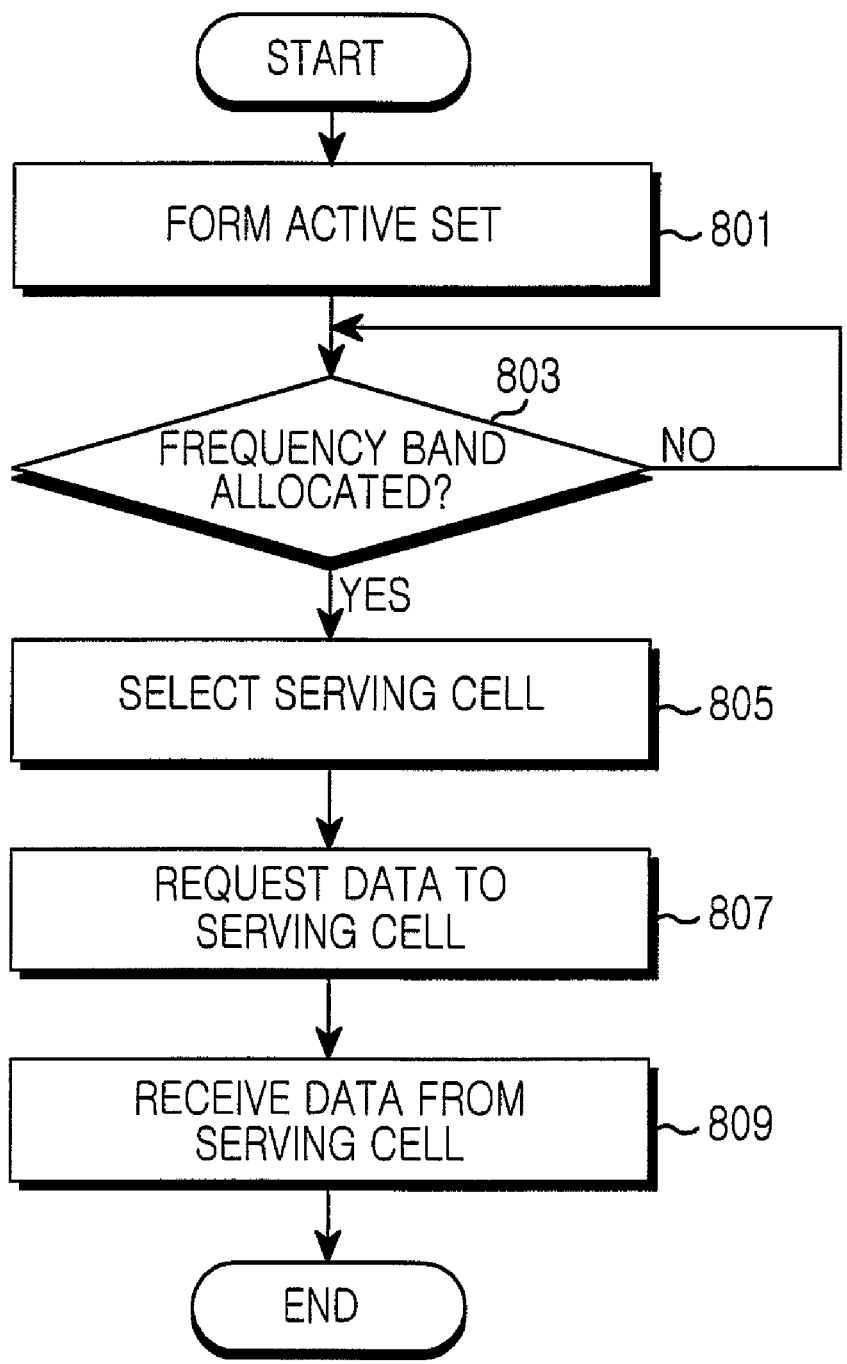
FIG. 8 is a flowchart illustrating an operation of an MS for reducing OCI in a broadband wireless communication system according to another exemplary embodiment of the present invention.
Figure 9:
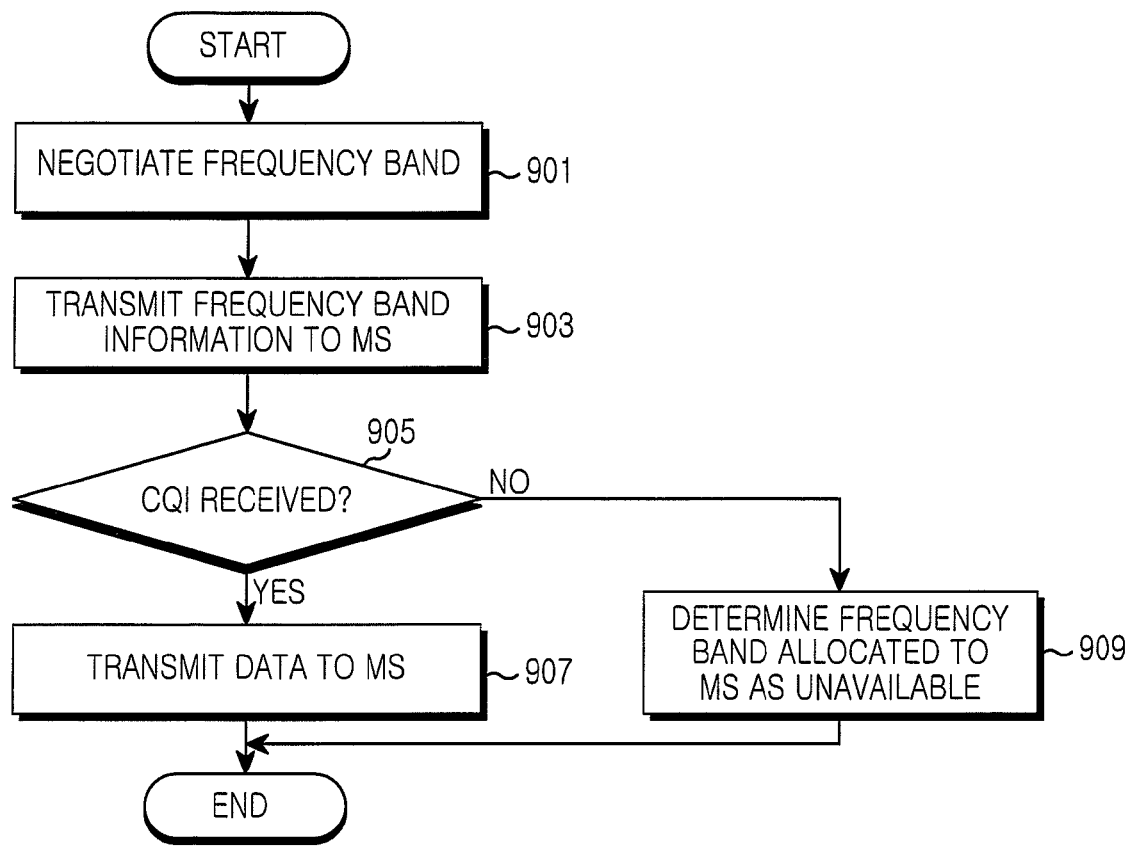
FIG. 9 is a flowchart illustrating an operation of a BS for reducing OCI in a broadband wireless communication system according to an exemplary embodiment of the present invention.

In the case where a frequency band to be allocated to the MS is determined by negotiations among the active cells, for OCI reduction, the MS and a BS operate in the procedures illustrated in FIGS. 8 and 9, respectively.

FIG. 8 is a flowchart illustrating an operation of an MS for reducing OCI in a broadband wireless communication system according to another exemplary embodiment of the present invention.

Referring to FIG. 8, the MS forms an active set in step 801. For example, the MS forms the active set according to at least one of the average power levels of neighbor cells, performance gain, and the loads of BSs covering the neighbor cells in the procedure of FIG. 4.

In step 803, the MS monitors reception of frequency band information from active cells of the active set. That is, the active cells predetermine a frequency band for the MS by negotiations and transmit information about the frequency band to the MS.

Upon receipt of the frequency band information, the MS monitors the channel statuses of all the active cells of the active set by measuring signals received in the allocated frequency band from the active cells and selects an active cell having the best channel status as a serving cell in step 805.

In step 807, the MS transmits the CQI of the signal received from the serving cell in the frequency band to the serving cell.

The MS then monitors a scheduling result on a control channel received from the serving cell in step 809. If the serving cell has scheduled data for the MS, the MS receives data in the allocated frequency band from the serving cell.

Then the MS ends the algorithm.

FIG. 9 is a flowchart illustrating an operation of a BS for reducing OCI in a broadband wireless communication system according to an exemplary embodiment of the present invention.

Referring to FIG. 9, the BS determines a frequency band to be allocated to the MS by negotiations with BSs covering other active cells in an active set in step 901. The BS acquires knowledge of the active set from the MS or by communications with other active cells.

The BS transmits information about the determined frequency band to the MS in step 903 and monitors reception of a CQI signal from the MS in step 905. The MS refers to an MS that has formed the active set.

Upon receipt of the CQI signal, the BS transmits data to the MS in the allocated frequency band in step 907 and then ends the algorithm.

On the other hand, if the BS fails to receive the CQI signal, it considers that the frequency band allocated to the MS is not available in step 909. That is, the BS does not use the frequency band.

The BS then ends the algorithm.

Figure 10:
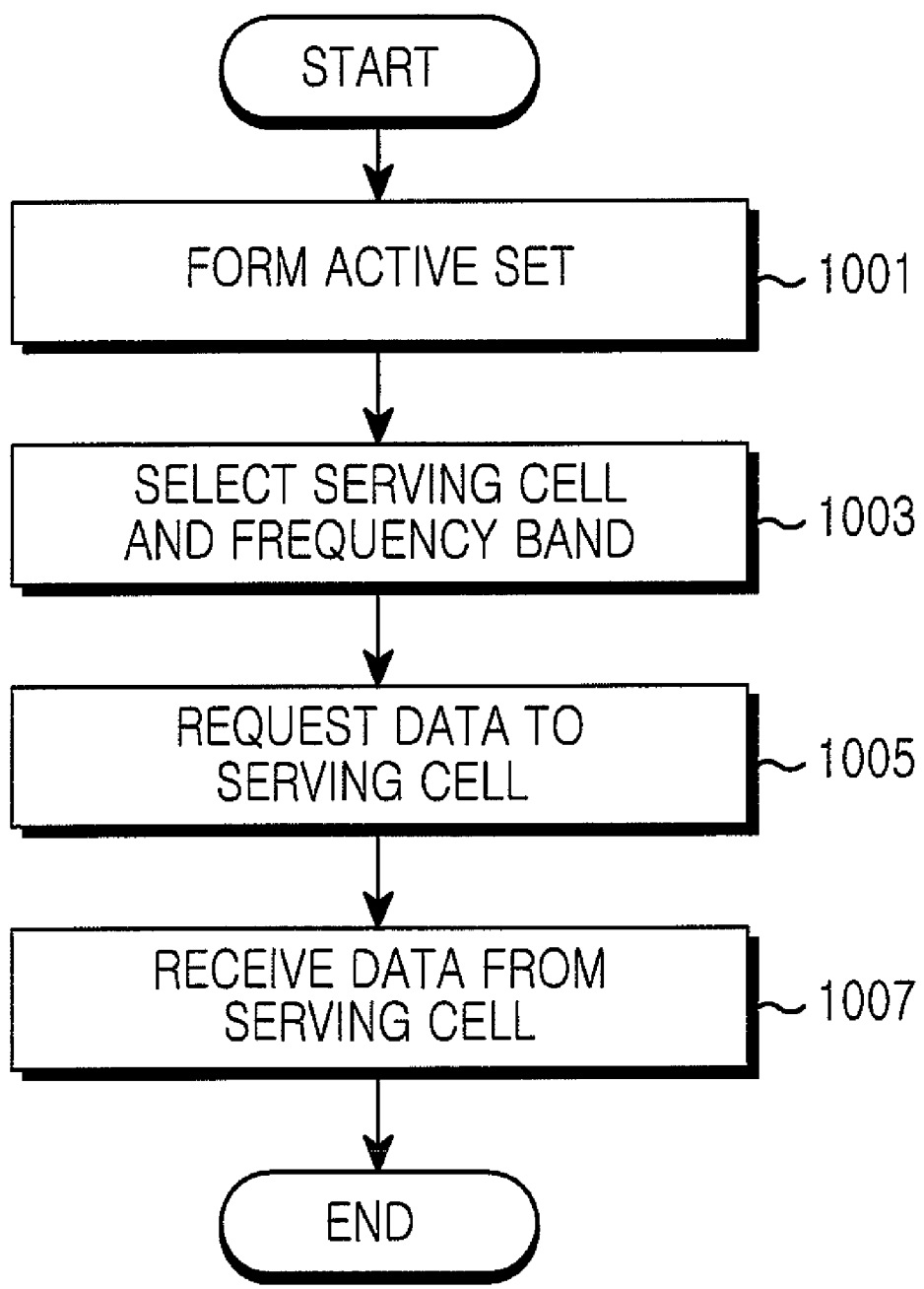
FIG. 10 is a flowchart illustrating an operation of an MS for reducing OCI in a broadband wireless communication system according to another exemplary embodiment of the present invention.
Figure 11:
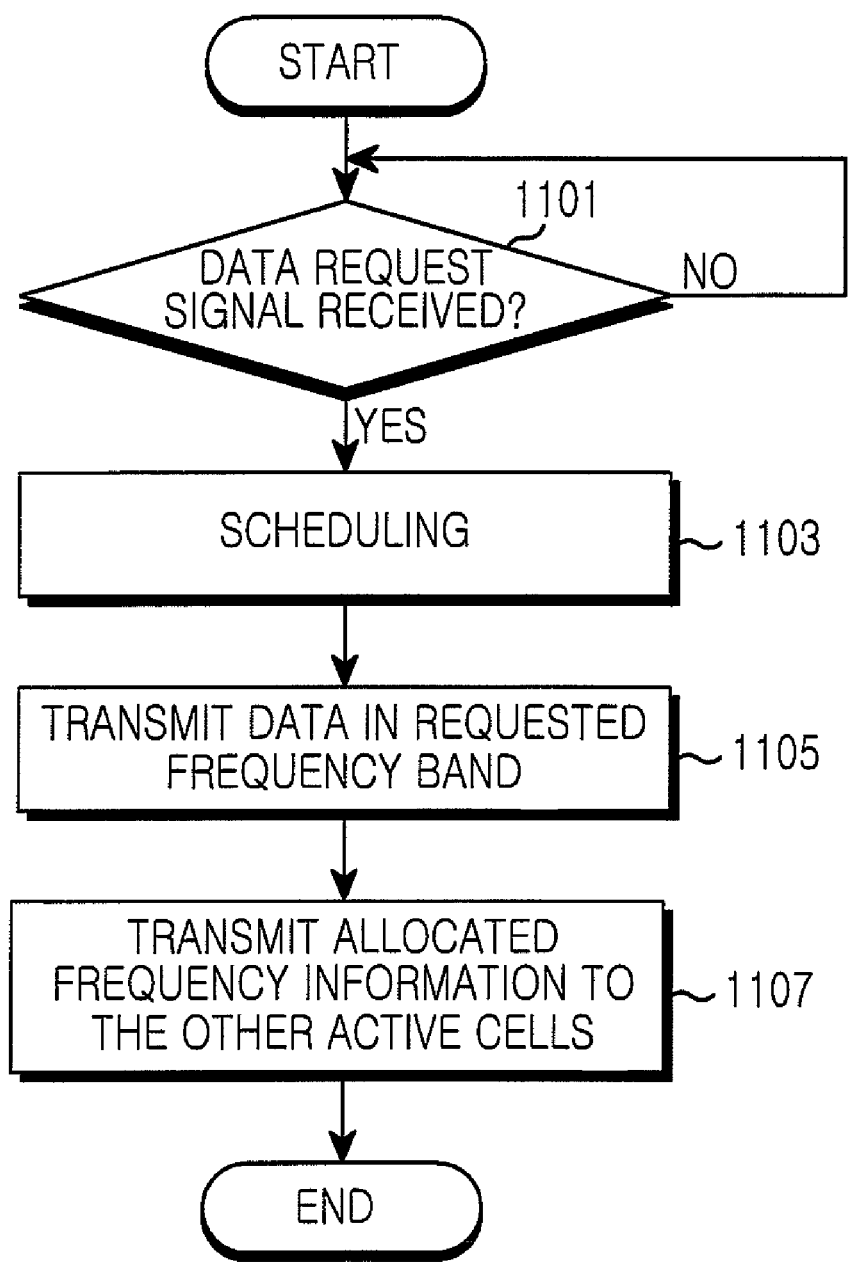
FIG. 11 is a flowchart illustrating an operation of a BS for reducing OCI in a broadband wireless communication system according to another exemplary embodiment of the present invention.

In the case where the MS selects a serving cell and a frequency band and OCI is avoided by a scheduling-off request signal transmitted from the MS or exchanging information among active cells, the MS and the BS operate in the procedures illustrated in FIGS. 10 and 11, respectively.

FIG. 10 is a flowchart illustrating an operation of an MS for reducing OCI in a broadband wireless communication system according to another exemplary embodiment of the present invention.

Referring to FIG. 10, the MS forms an active set in step 1001. For example, the MS forms the active set according to at least one of the average power levels of neighbor cells, performance gain, and the loads of BSs covering the neighbor cells using the procedure of FIG. 4.

In step 1003, the MS measures the channel statuses of all active cells of the active set by measuring signals received from the active cells and selects an active cell and a frequency band in the best channel status.

In step 1005, the MS transmits a data request signal to the selected active cell, i.e. a serving cell. The data request signal includes information about the desired frequency band and the CQI of the frequency band. If information is not exchanged among the active cells of the active set to avoid OCI, the MS transmits the CQI to the serving cell and transmits a scheduling-off request signal to the other active cells except the serving cell, requesting them not to schedule in the frequency band.

In step 1007, the MS monitors a control channel from the serving cell. If the serving cell has scheduled data for the MS, the MS receives the data in the frequency band. Then the MS ends the algorithm.

FIG. 11 is a flowchart illustrating an operation of a BS for reducing OCI in a broadband wireless communication system according to another exemplary embodiment of the present invention.

Referring to FIG. 11, the BS monitors reception of a data request signal from the MS in step 1101. The data request signal includes frequency band information and a CQI that are related to a cell covered by the BS.

Upon receipt of the data request signal, the BS schedules data according to the CQI and a scheduling condition in step 1103. That is, the BS determines whether to allocate a requested frequency band to the MS by scheduling according to the scheduling condition.

If determining to allocate the requested frequency band to the MS, the BS transmits data to the MS in the frequency band according to a scheduling result in step 1105.

If the MS does not transmit a scheduling-off request signal for the frequency band, the BS transmits information about the allocated frequency band to the other active cells of an active set so that the other active cells do not use the frequency band in step 1107.

Then the BS ends the algorithm.

Now a description will be made of exemplary configurations of the MS and the BS, for reducing OCI when the MS is located at a cell boundary.

Figure 12:
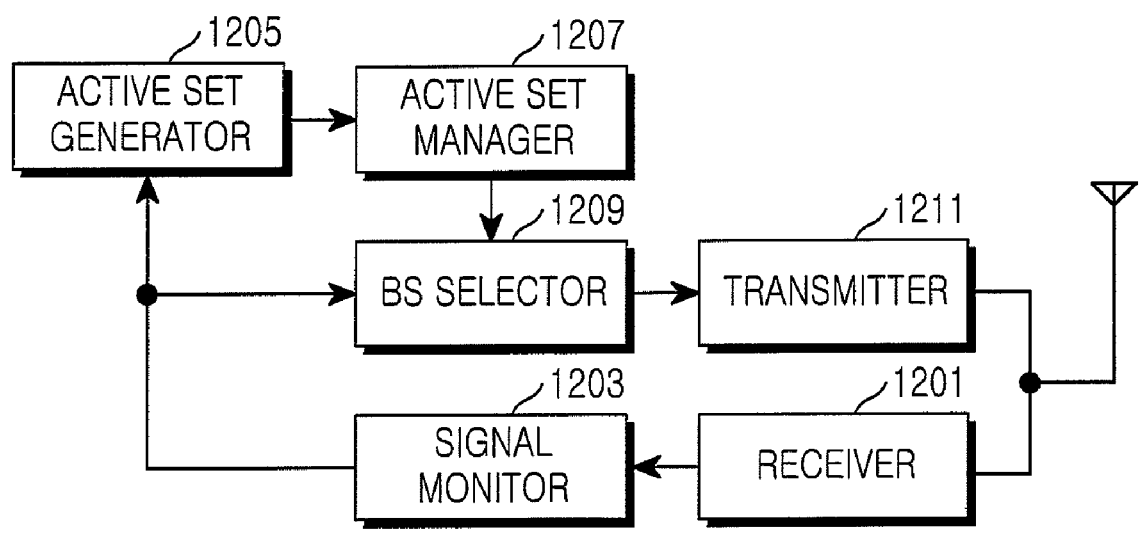
FIG. 12 is a block diagram illustrating an MS for reducing OCI in a broadband wireless communication system according to an exemplary embodiment of the present invention.

FIG. 12 is a block diagram illustrating an MS for reducing OCI in a broadband wireless communication system according to an exemplary embodiment of the present invention.

Referring to FIG. 12, the MS includes a receiver 1201, a signal monitor 1203, an active set generator 1205, an active set manager 1207, a BS selector 1209, and a transmitter 1211.

The receiver 1201 downconverts a Radio Frequency (RF) signal received through an antenna to a baseband signal. The receiver 1201 also demodulates and decodes the baseband signal at a Modulation and Coding Scheme (MCS) level.

The signal monitor 1203 measures the channel statuses (e.g. SINRs) of neighbor cells using signals received from the receiver 1201 and transmits the CQIs of the cells to the active set generator 1205 and the BS selector 1209.

Figure 13:
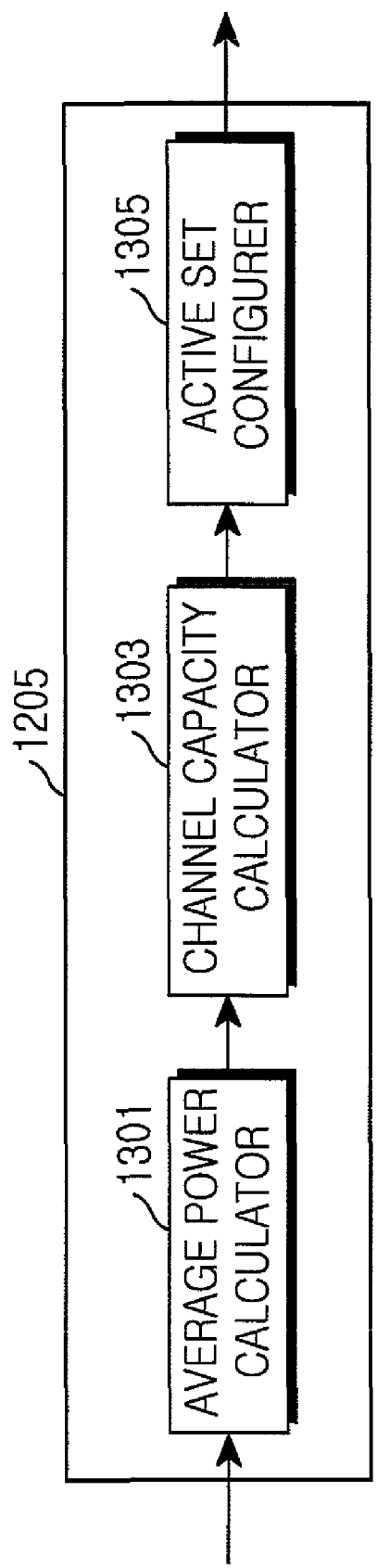
FIG. 13 is a block diagram illustrating an exemplary active set generator.

An exemplary configuration of an active set generator 1205 is illustrated in FIG. 13.

Referring to FIG. 13, an exemplary active set generator 1205 includes an average power calculator 1301, a channel capacity calculator 1303, and an active set configurer 1305, for forming an active set.

The average power calculator 1301 determines the average power levels of the cells according to the CQIs of the cells. Then the average power calculator 1301 selects an $i^{th}$ cell having the highest average power level from among non-active cells and notifies the channel capacity calculator 1303 of the $i^{th}$ cell.

The channel capacity calculator 1303 determines the channel capacity $C(\Omega \cup i)$ of an active set that would include the $i^{th}$ cell using Equation (1).

The active set configurer 1305 determines a performance gain that can be achieved from the active set that would include the $i^{th}$ cell and compares the performance gain with a threshold, to thereby determine whether to include the $i^{th}$ cell in the active set. For example, if the performance gain is larger than the threshold, the active set configurer 1305 adds the $i^{th}$ cell to the active set. If the performance gain is less than or equal to the threshold, the active set configurer 1305 does not includes the $i^{th}$ cell in the active set. The threshold my be decided taking into account at least one of a gain and cost that would result from adding the $i^{th}$ cell to the active set.

With reference again to FIG. 12, the active set manager 1207 generates a final active set by determining whether the active cells of the active set formed by the active set generator 1205 have approved designation of the cells as the active cells. For example, the active set manager 1207 transmits an active set approval request signal to BSs covering the active cells. The BSs determine whether to approve the active set according to their loads. If the load of a BS is large, the BS rejects designation of a cell covered by the BS as an active cell. If the load is small, the BS approves designation of the cell as an active cell.

Then the active set manager 1207 removes active cells that have rejected the active set from the active set, thus forming a final active set.

The active set manager 1207 compares the final active set with the old active set, connects to a newly added cell, and releases a connection from a cell that is not included in the final active set.

The BS selector 1209 selects a cell having the best channel status as a serving cell according to the CQIs of the cells received from the signal monitor 1203.

If a centralized scheduler schedules the active cells of the active set, the BS selector 1209 may not be used.

The transmitter 1211 transmits a data request signal or a CQI to the serving cell.

Figure 14:
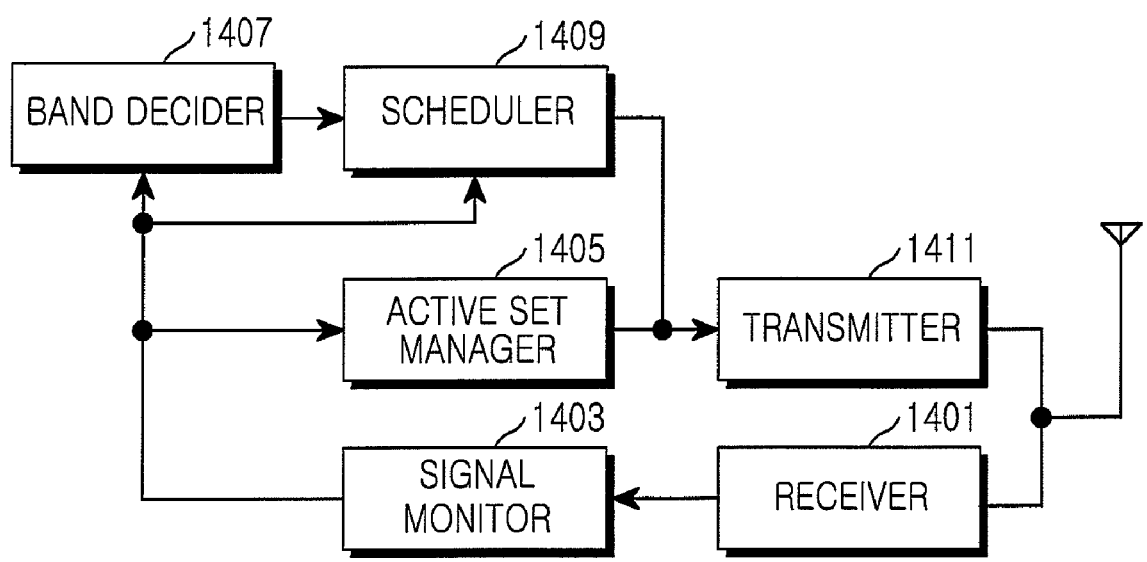
FIG. 14 is a block diagram illustrating a BS for reducing OCI in a broadband wireless communication system according to an exemplary embodiment of the present invention.

FIG. 14 is a block diagram illustrating a BS for reducing OCI in a broadband wireless communication system according to an exemplary embodiment of the present invention.

Referring to FIG. 14, the BS includes a receiver 1401, a signal monitor 1403, an active set manager 1405, a band decider 1407, a scheduler 1409, and a transmitter 1411.

The receiver 1401 downconverts an RF signal received through an antenna to a baseband signal. The receiver 1401 also demodulates and decodes the baseband signal at a desired level.

The signal monitor 1403 identifies a signal received from the receiver 1401. For example, the signal monitor 1403 identifies a CQI signal, a data request signal, and an active set approval request signal received from the MS, and a frequency band negotiation signal for allocating a frequency band to the MS.

Upon receipt of the active set approval request signal from the signal monitor 1403, the active set manager 1405 evaluates its load status and determines whether to approve the active set approval request. For example, if the load is large, the BS rejects an active set. If the load is small, the BS approves the active set.

The band decider 1407 determines a frequency band to be allocated to the MS, when negotiating the frequency band with the other active cells of an active set.

The scheduler 1409 schedules data according to a CQI received from the signal monitor 1403 and frequency band information received from the band decider 1407.

Using an antenna, the transmitter 1411 transmits a signal indicating whether the active set, received from the active set manager 1405, has been approved or rejected. The transmitter 1411 also transmits data according to a scheduling result received from the scheduler 1409 through the antenna. If the scheduler 1409 schedules data so as to allocate a requested frequency band to the MS, the transmitter 1411 transmits a control signal for preventing the other active cells of the active set from using the allocated frequency band.

Figure 15B:
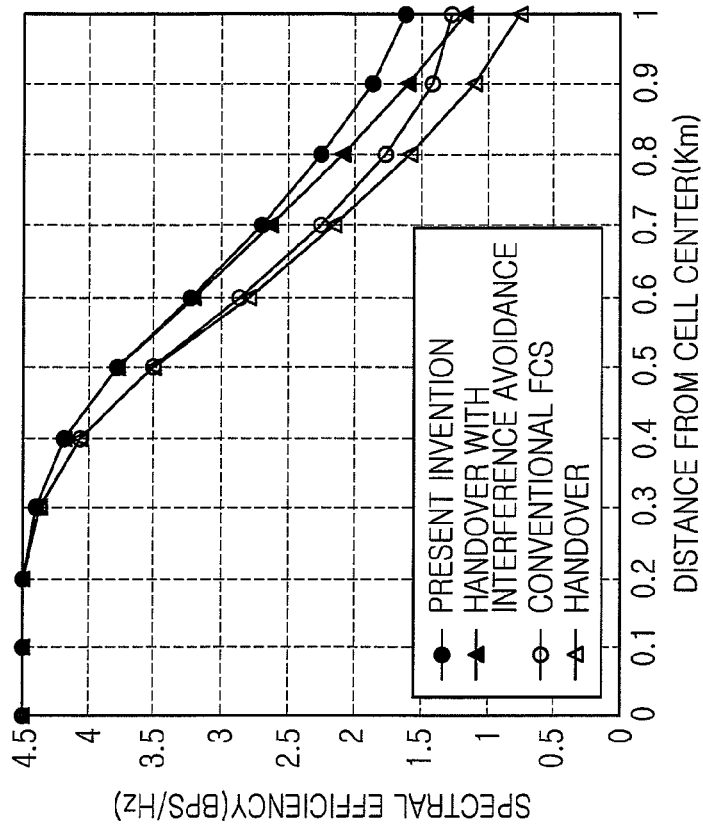
FIGS. 15A and 15B are graphs illustrating changes of performance according to an exemplary embodiment of the present invention.
Figure 15A:
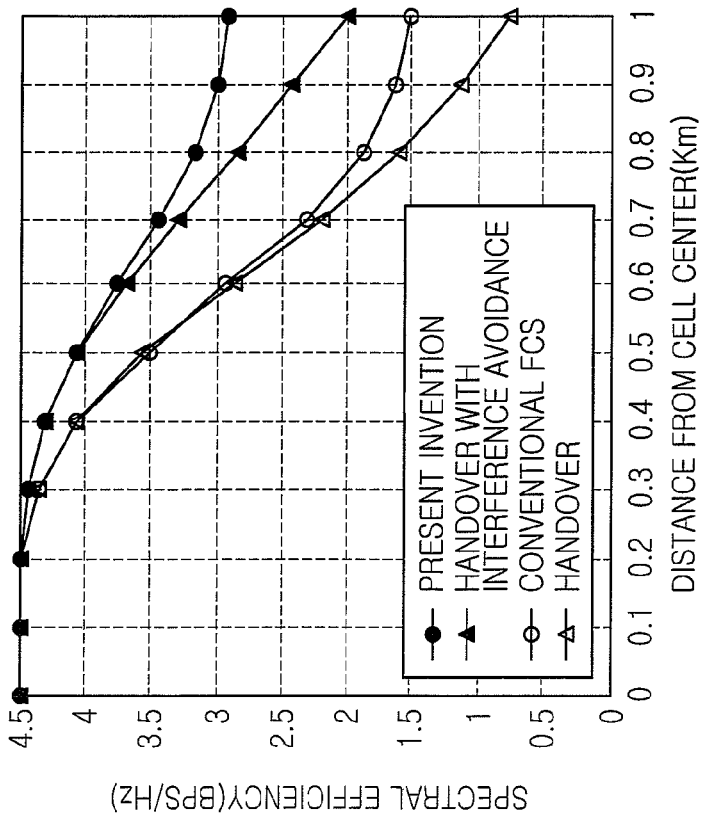

FIGS. 15A and 15B are graphs illustrating changes of performance according to an exemplary embodiment of the present invention. The graphs compare a hard handover, a conventional FCS, a hard handover with OCI avoidance, and an FCS with OCI avoidance according to exemplary embodiments of the present invention, in terms of spectral efficiency with respect to the distance of an MS to a cell center. Specifically, FIG. 15A illustrates spectral efficiency when an active set includes three cells and FIG. 15B illustrates spectral efficiency when an active set includes two cells. The horizontal axis represents the distance of the MS from the center of a cell and the vertical axis represents spectral efficiency. The following description is made on the assumption of a 2-tier 19-cell environment.

Referring to FIGS. 15A and 15B, the broadband wireless communication system calculates spectral efficiency according to Shannon's capacity under ideal link adaptation. The maximum spectral efficiency of the MS is limited to 4.5 bps/Hz and if the reception SINR of the MS is −5 dB or below, this is defined as outage.

As the graphs reveal, the conventional FCS and an exemplary FCS of the present invention have good spectral efficiency at a cell boundary, compared to the hard handover. Especially when OCI is avoided in FCS according to the present invention, the FCI with OCI avoidance has better frequency efficiency at the cell boundary than the hard handover, the conventional FCS, and the hard handover with OCI avoidance.

A comparison between FIG. 15A and FIG. 15B indicates that embodiments of the present invention offer better frequency efficiency as an active set includes more cells.

Figure 16:
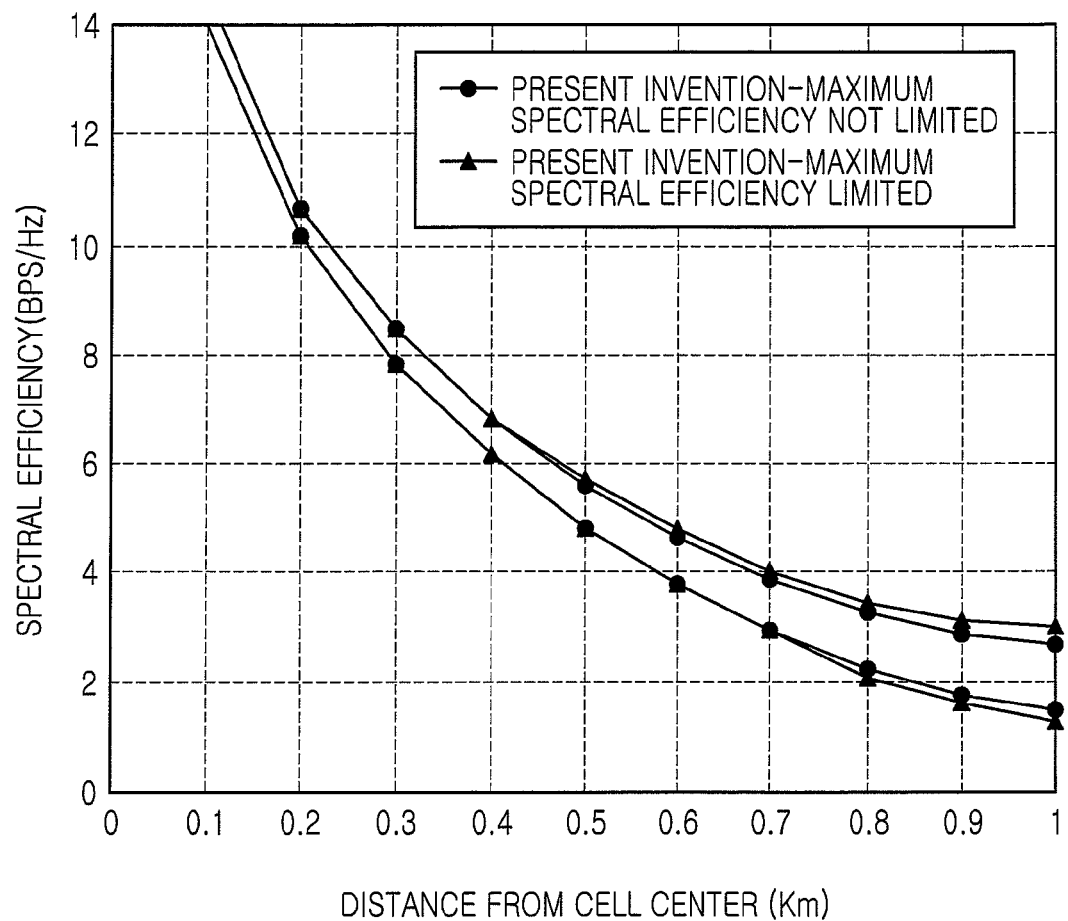
FIG. 16 is a graph illustrating changes of performance according to another exemplary embodiment of the present invention.

FIG. 16 is a graph illustrating changes of performance according to another exemplary embodiment of the present invention. Specifically, the graph illustrates performance upper bound and simulation results of performance, when an active set includes two or three cells. The horizontal axis represents the distance of an MS from the center of a cell and the vertical axis represents spectral efficiency.

When the active set includes three cells, the performance upper bound approaches the simulated performance. When the active set includes two cells, the performance upper bound is lower than the simulated performance as the MS is nearer to a cell boundary, but the performance difference is negligibly small. Therefore, embodiments of the present invention can be implemented using the performance upper bound.

In accordance with exemplary embodiments of the present invention as described above, since an FCS scheme is performed while avoiding OCI in a broadband wireless communication system, the effects of OCI caused by the poor link status of an MS located at a cell boundary are reduced and the resulting site selection diversity gain improves performance. Also, as an active set is formed through performance analysis, an active set suitable for the FCS scheme with OCI avoidance can be generated.

While the invention has been shown and described with reference to exemplary embodiments thereof, it will be understood by those skilled in the art that various changes in form and details may be made therein without departing from the spirit and scope of the invention as defined by the appended claims and their equivalents.

What is claimed is:

1. A Mobile Station (MS) in a wireless communication system using Fast Cell site Selection (FCS), comprising:
- a receiver for monitoring channel statuses of neighbor cells using signals received from the neighbor cells;
- an active set generator for generating an active set according to at least one of the channel statuses of the neighbor cells, loads of the neighbor cells, and a performance gain from the neighbor cells;
- a Base Station (BS) selector for selecting a serving cell from the active set according to the channel statuses of cells included in the active set; and
- a transmitter for transmitting a data request signal including at least one of Channel Quality Information (CQI) of the selected serving cell and a requested frequency band to the serving cell,
- wherein the transmitter transmits to the other cells of the active set except the selected serving cell a signal requesting the other cells not to use a frequency band that is used for communications between the serving cell and the MS.

2. The mobile station of claim 1, wherein the receiver monitors the channel statuses of the neighbor cells by instantaneous Signal-to-Interference and Noise Ratios (SINRs) of the signals received from the neighbor cells.

3. The mobile station of claim 1, wherein the active set generator comprises:
an average power calculator for selecting a cell with the highest average power level using the channel statuses of the neighbor cells;
a channel capacity calculator for calculating a channel capacity that can be achieved when the selected cell is included in the active set; and
an active set configurer for determining whether to add the selected cell to the active set according to a performance gain calculated from the channel capacity.

4. The mobile station of claim 3, wherein the average power calculator determines the average power levels of the neighbor cells using the channel statuses of the neighbor cells and selects the cell with the highest average power level from among cells that are not included in the active set.

5. The mobile station of claim 3, wherein the active set configurer adds the selected cell to the active set if the performance gain is larger than a threshold and does not add the selected cell to the active set if the performance gain is less than or equal to the threshold.

6. The mobile station of claim 5, wherein the threshold is determined according to at least one of a gain and a cost which can result from adding a cell to the active set.

7. The mobile station of claim 3, further comprising an active set manager for transmitting an active set approval request signal to the cells included in the active set and for reconfiguring the active set according to active set approval response signals received from the cells included in the active set.

8. The mobile station of claim 7, wherein the active set manager removes a cell that rejects the active set approval request from the active set.

9. The mobile station of claim 1, wherein the BS selector selects a cell in the best channel status from among the cells included in the active set.

10. A Base Station (BS) in a wireless communication system using Fast Cell site Selection (FCS), comprising:
a receiver for receiving a signal from at least one of a Mobile Station (MS) and a neighbor cell;
an active set manager for upon receipt of an active set approval request signal from the MS, determining whether to approve the active set approval request according to a load of the BS;
a scheduler for, upon receipt of a data request signal, scheduling the MS according to a channel status of the MS; and
a transmitter for transmitting to other cells included in the active set except the BS a signal requesting the other cells not to use a frequency band, when the frequency band is allocated to the MS through the scheduling by the scheduler.

11. The base station of claim 10, wherein the active set manager rejects the active set approval request if the load of the BS is large and approves the active set approval request if the load of the BS is small.

12. The base station of claim 10, wherein, upon receipt of the data request signal, the scheduler schedules the MS according to at least one of Channel Quality Information (CQI) and a requested frequency band included in the data request signal.

13. The base station of claim 10, further comprising a band decider for determining a frequency band to be allocated to the MS by negotiating with the other cells included in the active set.

14. A method for configuring an active set in a wireless communication system using Fast Cell site Selection (FCS), the method comprising:
selecting a cell with the highest average power level from among neighbor cells;
calculating a performance gain that can be achieved by adding the selected cell to the active set; and
adding the selected cell to the active set if the performance gain is increased.

15. The method of claim 14, further comprising not adding the selected cell to the active set if the performance gain is decreased.

16. The method of claim 14, further comprising:
transmitting an active set approval request signal to cells included in the active set;
receiving active set approval response signals from the cells included in the active set; and
removing a cell that rejects the active set approval request from the active set.

17. A method for operating a scheduler for avoiding interference in a wireless communication system using Fast Cell site Selection (FCS), the method comprising:
evaluating Channel Quality Information (CQIs) of neighbor cells of a Mobile Station (MS) received from the MS;
performing scheduling for the MS according to the CQIs; and
performing, when a serving cell and a frequency band are selected for the MS through the scheduling, scheduling not to allocate the selected frequency band to the other cells included in an active set except the selected serving cell.

18. The method of claim 17, further comprising transmitting information about the selected frequency band and information about the MS to the selected serving cell.

19. The method of claim 17, wherein the CQIs comprise channel status information of cells included in the active set.

20. The method of claim 17, wherein the CQIs comprise instantaneous Signal-to-Interference and Noise Ratios (SINRs).

21. A method for operating a Mobile Station (MS) for avoiding interference in a wireless communication system using Fast Cell site Selection (FCS), the method comprising:
generating an active set according to at least one of average power levels, loads, and a performance gain of neighbor cells;
detecting information about a frequency band for communicating with a serving cell from a cell included in the active set;
selecting a cell having the best channel status of the frequency band from among the cells included in the active set;
transmitting a data request signal to the selected cell in the frequency band; and
transmitting to unselected cells included in the active set a signal requesting the unselected cells not to use the frequency band.

22. The method of claim 21, wherein the channel statuses comprise instantaneous Signal-to-Interference and Noise Ratios (SINRs).

23. A method for operating a Base Station (BS) for avoiding interference in a wireless communication system using Fast Cell site Selection (FCS), the method comprising:
transmitting to a Mobile Station (MS) information about a frequency band to be allocated to the MS, the frequency band being determined by negotiations with neighbor cells included in an active set;

transmitting data to the MS in the frequency band, upon receipt of a data request signal from the MS; and determining not to use the frequency band allocated to the MS when the data request signal is not received from the MS.

24. The method of claim 23, wherein the data request signal comprises Channel Quality Information (CQI).

25. A method for operating a Base Station (BS) for avoiding interference in a wireless communication system using Fast Cell site Selection (FCS), comprising:

detecting, upon receipt of a data request signal from a Mobile Station (MS), Channel Quality Information (CQI) and information about a requested frequency band from the data request signal;

scheduling the MS using the CQI; and transmitting to other cells included in an active set except the BS a signal requesting the other cells not to use the frequency band, if the requested frequency band is allocated to the MS by the scheduling.

26. The method of claim 25, wherein the CQI comprises an instantaneous Signal-to-Interference and Noise Ratio (SINR).

27. A scheduler for avoiding interference in a wireless communication system using Fast Cell site Selection (FCS), comprising:

means for evaluating Channel Quality Information (CQIs) of neighbor cells of a Mobile Station (MS) received from the MS;

means for performing scheduling for the MS according to the CQIs; and means for performing, when a serving cell and a frequency band are selected for the MS through the scheduling, scheduling not to allocate the selected frequency band to the other cells included in an active set except the selected serving cell.

\* \* \* \* \*